Patented Feb. 7, 1933

1,896,892

UNITED STATES PATENT OFFICE

ROBERT HALLER, OF RIEHEN NEAR BASEL, AND ALPHONSE HECKENDORN, OF BASEL, SWITZERLAND, ASSIGNORS TO FIRM SOCIETY OF CHEMICAL INDUSTRY IN BASLE, OF BASEL, SWITZERLAND

CELLULOSE DERIVATIVES AND PROCESS OF MAKING SAME

No Drawing. Application filed January 23, 1930, Serial No. 422,950, and in Switzerland April 11, 1929.

The present invention relates to the manufacture of new cellulose derivatives. It comprises the process of making these products as well as the new products themselves.

It has been found that new cellulose derivatives are obtained by treating cellulose which has been previously treated with alkalies or swelling agents, with such heterocyclic compounds which contain one or more than one

group, such as cyanuric chloride of the formula

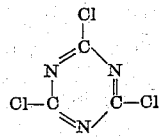

cyanuric bromide of the formula

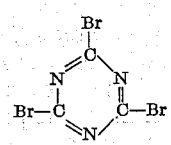

or another compound of the triazine series having at least one exchangeable halogen atom, dichloroquinazoline of the formula

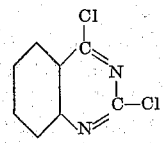

dichlorophthalazine of the formula

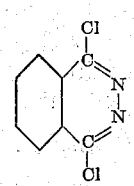

dichloride of maleic acid hydrazide of the formula

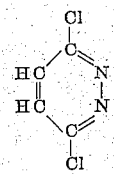

tribromopyrimidine of the formula

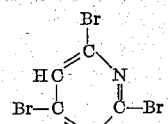

chloropyrrolidone of the formula

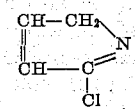

isatine chloride of the formula

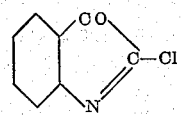

or the like, which new derivatives in many cases are characterized by valuable properties of dyeing. The new products may still contain exchangeable halogen atoms and may therefore be further condensed with compounds containing hydrogen atoms capable of reaction, such as water, alkali sulfides, amines, or the like. Hence, all these new products are cellulose derivatives which are characterized by the presence of the grouping

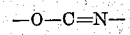

which grouping, on the one hand, is united by the ether linkage $-O-$ to the cellulose molecule and in which, on the other hand, the grouping

belongs to a heterocyclic residue. They are insoluble in the solvents for acidyl-, alkyl- or nitro-cellulose, such as acetone, chloroform, glacial acetic acid, tetrachlorethane, xylene, and the like. As regards their dyeing properties these products are distinguished from cellulose or cotton either by the fact that they are immune towards the usual cotton dyestuffs, such as direct dyeing dyestuffs or vat-dyestuffs, or that they show affinity to acid or basic dyestuffs, or even to the insoluble, weakly basic products which are used for the dyeing of the acetate silk. The new products may also combine in themselves several of these properties.

The treatment of the cellulose with alkalies may occur in aqueous medium or preferably in alcoholic medium. In the latter case, there is obtained after the treatment with the heterocyclic halogen compound, which treatment is advantageously carried out in presence of an indifferent diluent, such as xylene, toluene, tetrachlorethane, or the like, a product which, although but little increase of weight has occurred, is strongly immunized towards direct cotton dyestuffs, vat-dyestuffs and sulfur dyestuffs, and on the other hand clearly shows strong affinity to basic dyestuffs and a marked affinity to insoluble acetate silk dyestuffs. As compared with cellulose immunized by means of halides of strong acids, the new products have the advantage that they retain their strength during prolonged storage. Besides, the products thus treated are stable to the saponifying action of the alkalies. In this respect they are further advantageously distinguished from the cellulose products immunized by acidylation. If these products are then caused to react with amines their affinity to basic dyestuffs disappears and products are obtained which are characterized by a pronounced affinity to acid dyestuffs; their immunity towards direct dyestuffs, vat-dyestuffs and sulfur dyestuffs as a rule remains however.

This process is adapted both to natural and regenerated cellulose. Further, the cellulose may be dyed with suitable dyestuffs, such as, for example, vat-dyestuffs or substantive dyestuffs fast to alkali, without that by the prescribed treatment an essential alteration of shade occurs.

The following examples illustrate some forms of carrying out the new process, but the proportions and concentrations named therein may be varied within wide limits; the parts are by weight:—

Example 1

Cotton is impregnated with an alcoholic solution of potash of 10 per cent. strength and the excess liquor is separated by pressing or centrifuging. The cotton is then treated at 25–40° C. for ½ to 2 hours in a solution of cyanuric chloride in xylene in the presence of powdered chalk. For 10 parts of cotton there may be used, for example, 3–5 parts of cyanuric chloride. The proportion of solvent is determined by the nature of the apparatus, care having to be taken that the material is uniformly impregnated by the solution. When the reaction is complete the goods are rinsed hot, then washed with water containing some hydrochloric acid and once more rinsed quickly in warm water. The cellulose derivative thus obtained is immune towards direct, sulfur and vat-dyestuffs and acid dyestuffs; on the other hand, it can be dyed by means of basic dyestuffs and insoluble acetate silk dyestuffs. By boiling the goods with water their properties of being dyed are not changed.

If a cotton fabric containing effect threads prepared as described in the preceding paragraph, is dyed with vat-dyestuffs, for example Cibanone Brown GR, the effect threads remain white. If the effect threads, previous to the treatment with cyanuric chlorid, are dyed with a vat-dyestuff, such as Cibanone Blue RS, Ciba, Violet B or Cibanone Yellow G, blue, violet or yellow effects on a brown bottom are obtained.

Also with other dyestuffs effects are obtained. If the effect threads are for example dyed, previous to the treatment with cyanuric chloride, with substantive dyestuffs, such as Cotton Yellow CH or Direct Fast Scarlet SE, and the finished cotton fabric is then dyed with Chlorantine Fast Blue 4GL, red and yellow effects on a blue bottom are obtained.

Example 2

Cotton is impregnated with an alcoholic solution of potash of 10 per cent. strength and pressed or centrifuged. The goods are then heated for ½–2 hours at 70–80° C. in a solution of cyanuric bromide in xylene corresponding with 5 parts of cyanuric bromide for 10 parts of cotton in the presence of powdered chalk. Rinsing follows as described in Example 1. A similar product is obtained.

Example 3

Artificial silk, for example, viscose silk, is impregnated with an alcoholic solution of potash of 10 per cent. strength, the excess of the liquor is removed by pressing or centrifuging and the goods are treated in a solution of 2–5 parts of cyanuric chloride (for 10 parts of cellulose) in 150–250 parts of xylene at ordinary temperature for 2–3 hours in the presence of some chalk powder. Rinsing follows as described in Example 1. A similar product is obtained.

Example 4

Cotton is impregnated in an alcoholic solution of potash of 10 per cent. strength and pressed or centrifuged. The goods are then treated in a boiling solution of dichloride of maleic acid hydrazide in xylene in presence of some chalk powder for 1-2 hours. Rinsing follows as described in Example 1. The product obtained is similar to that of the said example.

*Example 5*

Cotton is impregnated with an alcoholic solution of potash of 10 per cent. strength and then pressed or centrifuged. The goods thus pre-treated are further treated in a solution of dichloroquinazoline in xylene heated to gentle boiling until the fibre is uniformly immune towards direct-dyestuffs. Washing follows as described in Example 1 and the product is similar to that of the said example.

*Example 6*

Bleached or unbleached cotton is impregnated with potash solution of 15 per cent. strength made by dissolving potash in a mixture of 2 parts of water and 1 part of alcohol. After pressing off the excess liquor the goods are treated in a solution of 5 parts of cyanuric chloride (for 10 parts of cotton) with vigorous movement or reeling for the purpose of ensuring uniform action during ½ hour at room temperature. Some chalk powder may advantageously be added. After rinsing in some acetone (for removing excess of cyanuric chloride) and cold water the yarn is immediately further treated in an aqueous solution of diethylethylenediamine by leaving it therein for 12-24 hours at ordinary temperature. After rinsing and drying, the cellulose derivative thus obtained, unlike the product of Example 1, has no longer affinity to basic dyestuffs but can be dyed by means of acid wool dyestuffs. With ethylenediamine a similar result is obtained.

*Example 7*

Mercerized or non-mercerized cotton is impregnated with an aqueous solution of caustic soda of 15 per cent. strength and after having been pressed is further treated with a solution of cyanuric chloride in xylene at 0 to $-10°$ C. for 1-2 hours; after a short rinsing in cold water the goods are then further treated in an aqueous solution of piperazine. The properties of the product thus obtained are similar to those of the product of Example 6.

*Example 8*

The cotton etherified by means of cyanuric chloride as described in Example 6 is further treated in a solution of 10 per cent. strength of aniline and benzine for a long time at room temperature. The affinity of the product towards basic dyestuffs as compared with that of the product which has not been subjected to this final treatment is somewhat weaker; on the other hand, the affinity for acid dyestuffs is retained.

*Example 9*

If cellulose which has been prepared by the procedure of Example 6 or 7 is further treated in an aqueous solution of sodium hydrosulfide, the affinity to basic dyestuffs is retained and the immunity towards cotton dyestuffs remains.

What we claim is:—

1. Process for the manufacture of new cellulose derivatives, consisting in treating alkali cellulose with heterocyclic compounds which contain at least once the

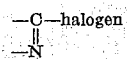

group.

2. Process for the manufacture of new cellulose derivatives, consisting in treating, in presence of an indifferent diluent, alkali cellulose with heterocyclic compounds which contain at least once the

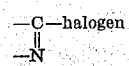

group.

3. Process for the manufacture of new cellulose derivatives, consisting in treating, in presence of an indifferent diluent, alkali cellulose with heterocyclic compounds which contain at least twice the

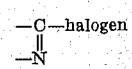

group in a six-membered ring.

4. Process for the manufacture of new cellulose derivatives, consisting in treating, in presence of an indifferent diluent, alkali cellulose, which is made by impregnating the cellulose in caustic potash solution of 15 per cent. strength, obtained by dissolving the caustic alkali in a mixture of 2 parts of water and 1 part of alcohol, with heterocyclic compounds containing at least twice the

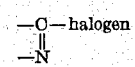

group in a six-membered ring, and further treating the products thus obtained with amines which still contain at least one exchangeable hydrogen atom linked with the nitrogen.

5. Process for the manufacture of new cellulose derivatives, consisting in treating, in presence of an indifferent diluent, alkali cellulose, which is made by impregnating the cellulose in caustic potash solution of 15 per cent. strength obtained by dissolving the caustic alkali in a mixture of 2 parts of water and 1 part of alcohol, with triazine compounds containing at least twice the

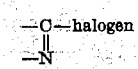

group in a six-membered ring, and further treating the products thus obtained with amines which still contain at least one exchangeable hydrogen atom linked with the nitrogen.

6. Process for the manufacture of new cellulose derivatives, consisting in treating, in presence of an indifferent diluent, alkali cellulose, which is made by impregnating the cellulose in caustic potash solution of 15 per cent. strength, obtained by dissolving the caustic alkali in a mixture of 2 parts of water and 1 part of alcohol, with cyanuric chloride and further treating the products thus obtained with compounds which contain at least one free —NH$_2$ group.

7. Process for the manufacture of new cellulose derivatives, consisting in treating, in presence of an indifferent diluent, alkali cellulose, which is made by impregnating the cellulose in caustic potash solution of 15 per cent. strength, obtained by dissolving the caustic alkali in a mixture of 2 parts of water and 1 part of alcohol, with cyanuric chloride and further treating the products thus obtained with compounds which contain besides at least one free NH$_2$-group a further basic group.

8. Process for the manufacture of new cellulose derivatives, consisting in treating, in presence of an indifferent diluent, alkali cellulose, which is made by impregnating the cellulose in caustic potash solution of 15 per cent. strength, obtained by dissolving the caustic alkali in a mixture of 2 parts of water and 1 part of alcohol, with cyanuric chloride and further treating the products thus obtained with compounds which contain besides at least one free NH$_2$ group a tertiary amino group.

9. As new products the cellulose derivatives which are characterized by the presence of the grouping

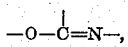

which grouping, on the one part, is united by the ether linkage —O— to the cellulose molecule and in which, on the other part, the grouping

belongs to a heterocyclic nucleus, which products are insoluble in the solvents for alkylated or acidylated or nitrated cellulose, and which are distinguished from cotton by their immunity towards the usual cotton dyestuffs and their affinity towards basic dyestuffs.

10. As new products the cellulose derivatives which are characterized by the presence of the grouping

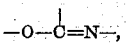

which grouping, on the one part, is united by the ether linkage —O— to the cellulose molecule and in which, on the other part, the grouping

belongs to a six-membered heterocyclic nucleus, which products are insoluble in the solvents for alkylated or acidylated or nitrated cellulose, and which are distinguished from cotton by their immunity towards the usual cotton dyestuffs and their affinity towards basic dyestuffs.

11. As new products the cellulose derivatives which are characterized by the presence of the grouping

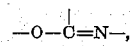

which grouping, on the one part, is united by the ether linkage —O— to the cellulose molecule and in which, on the other part, the grouping

belongs to a triazine nucleus, which products are insoluble in the solvents for alkylated or acidylated or nitrated cellulose, and which are distinguished from cotton by their immunity towards the usual cotton dyestuffs and their affinity towards basic dyestuffs.

In witness whereof we have hereunto signed our names this 13th day of January, 1930.

ROBERT HALLER.
ALPHONSE HECKENDORN.